United States Patent
Burgess et al.

(10) Patent No.: US 9,250,981 B2
(45) Date of Patent: *Feb. 2, 2016

(54) AUTOMATICALLY DERIVING A COMMAND FOR STARTING A PROGRAM IN AN OPERATING SYSTEM OF A COMPUTER

(71) Applicant: International Business Machines Corporation, Armonk, NY (US)

(72) Inventors: George M. Burgess, Winchester (GB); Grant J. Shayler, Eastleigh (GB); John D. Taylor, Hursley (GB); Gary O. Whittingham, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/855,990

(22) Filed: Apr. 3, 2013

(65) Prior Publication Data

US 2013/0268947 A1    Oct. 10, 2013

(30) Foreign Application Priority Data

Apr. 3, 2012   (GB) .................................. 1205955.6

(51) Int. Cl.
  *G06F 3/00*   (2006.01)
  *G06F 9/44*   (2006.01)
  *G06F 9/46*   (2006.01)
  *G06F 13/00*  (2006.01)
  *G06F 9/54*   (2006.01)
  *G06F 9/48*   (2006.01)
  *G06F 17/30*  (2006.01)

(52) U.S. Cl.
  CPC ................ *G06F 9/54* (2013.01); *G06F 9/4843* (2013.01); *G06F 17/30477* (2013.01); *G06F 2209/482* (2013.01)

(58) Field of Classification Search
None
See application file for complete search history.

(56) References Cited

U.S. PATENT DOCUMENTS

| 7,277,857 B1* | 10/2007 | Balaji et al. ................... 704/270 |
| 7,898,679 B2 | 3/2011 | Brack et al. |
| 2002/0078116 A1 | 6/2002 | Aoki |
| 2005/0132121 A1 | 6/2005 | Robinson |

(Continued)

FOREIGN PATENT DOCUMENTS

| JP | 2002049495 A | 2/2002 |
| JP | 2006293582 A | 10/2006 |

(Continued)

OTHER PUBLICATIONS

Burgess et al., "Automatically Deriving a Command for Starting a Program in an Operating System of a Computer," U.S. Appl. No. 14/487,147, filed Sep. 16, 2014, 20 pages.

(Continued)

*Primary Examiner* — Diem Cao
(74) *Attorney, Agent, or Firm* — Yee & Associates, P.C.; Parashos Kalaitzis

(57) ABSTRACT

An apparatus and program product for automatically deriving a command for starting a program in an operating system of a computer, the method comprising the steps of: identifying an address space provided by an operating system; identifying a program in the address space; searching data logged by the operating system as a result of processing the identified program to identify a start command for initiating processing of the identified program; and outputting the identified start command.

14 Claims, 3 Drawing Sheets

(56) References Cited

U.S. PATENT DOCUMENTS

| | | | |
|---|---|---|---|
| 2007/0074177 A1* | 3/2007 | Kurita et al. | 717/131 |
| 2009/0070455 A1* | 3/2009 | Cervantes | 709/224 |
| 2011/0265091 A1 | 10/2011 | Ly et al. | |

FOREIGN PATENT DOCUMENTS

| | | | |
|---|---|---|---|
| JP | 2007011728 A | 1/2007 | |
| JP | 2007140791 A | 6/2007 | |
| JP | 2009070141 A | 4/2009 | |

OTHER PUBLICATIONS

Loveland et al., "Testing z/OS: The Premier Operating System for IBM's zSeries server," IBM Systems Journal, vol. 41, Issue 1, Mar. 2002, pp. 55-73 (abstract).

GB search report dated Jul. 19, 2012 regarding application GB1205955.6, applicant International Business Machines Corporation, 4 pages.

Office Action, dated Jun. 4, 2015, regarding U.S. Appl. No. 14/487,147, 17 pages.

\* cited by examiner

AUTOMATICALLY DERIVING A COMMAND FOR STARTING A PROGRAM IN AN OPERATING SYSTEM OF A COMPUTER

CROSS-REFERENCE TO RELATED APPLICATION(S)

This application claims the benefit of priority to GB Application Serial No. 1205955.6, filed on Apr. 3, 2012, the contents of which are hereby incorporated by reference.

FIELD OF INVENTION

The present invention relates to the automatic derivation of a command for starting a program in an operating system of a computer.

BACKGROUND OF THE INVENTION

In computer systems, in order to start a program on an operating system, a series of start instructions are issued. Start instructions vary between operating systems, but typically involve a script in a file being processed. For example, in Windows (Windows is a trademark of Microsoft Corporation in the United States, other countries, or both), a script in a .bat file starts programs. In IBM® z/OS® (IBM and z/OS are trademarks of International Business Machines Corporation, registered in many jurisdictions worldwide) programs may be started by one or more instructions in a job control language (JCL). In z/OS programs may also be started by the direct input of a start command by a user and are referred to as started tasks or jobs. When a program is started it is commonly assigned an address space in which to operate.

On larger computers, such as multiuser systems or mainframes, there may be many programs running simultaneously each having an associated address space. Programs may have been started by many different users, at different times and may remain active for days or months. In some situations it may be desirable to stop or restart the programs in a selected address space, for example, to clone the address space or to enable the running program to be maintained with program updates. However, in order to control a program in a selected address space it is necessary to identify its start command. Typically identifying the start commands for a set of address spaces is performed manually since start commands cannot generally be derived directly from the address space itself. Thus deriving the relevant start commands is an error prone, complex and often significantly time consuming operation.

SUMMARY OF THE INVENTION

An embodiment of the invention provides a method for automatically deriving a command for starting a program in an operating system of a computer, the method comprising the steps of: identifying an address space provided by an operating system; identifying a program in the address space; searching data logged by the operating system as a result of processing the identified program to identify a start command for initiating processing of the identified program; and outputting the identified start command.

The searching may be performed only for individual user started programs. The searching may be omitted for batch programs. The program may be identified by a unique identifier. The identifier may comprise data indicating whether the associated program is a user started program or a batch program. The logged data may comprise a set of instructions provided for initiating the processing of the program in the address space. The set of instructions may be provided in a job control language. The logged data may comprise a set of processing messages reporting processing steps in the processing of the program in the address space.

The method may further comprise the steps of: searching the logged data to identify a set of parameters corresponding to the start command; and outputting any identified set of parameters in association with the identified start command. The method may comprise the further steps of: searching the logged data to identify the assignment of values to the set of parameters; and outputting any identified parameters values in association with the set of parameters.

The address space may be a virtual address space. The processing of the program may be managed by a job entry subsystem. The operating system may be z/OS.

Another embodiment provides apparatus for automatically deriving a command for starting a program in an operating system of a computer, the apparatus being operable to: identify an address space provided by an operating system; identify a program in the address space; search data logged by the operating system as a result of processing the identified program to identify a start command for initiating processing of the identified program; and output the identified start command.

A further embodiment provides a computer program stored on a computer readable medium and loadable into the internal memory of a computer, comprising software code portions arranged, when the program is run on a computer, for performing a method for automatically deriving a command for starting a program in an operating system of a computer, the method comprising the steps of: identifying an address space provided by an operating system; identifying a program in the address space; searching data logged by the operating system as a result of processing the identified program to identify a start command for initiating processing of the identified program; and outputting the identified start command.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
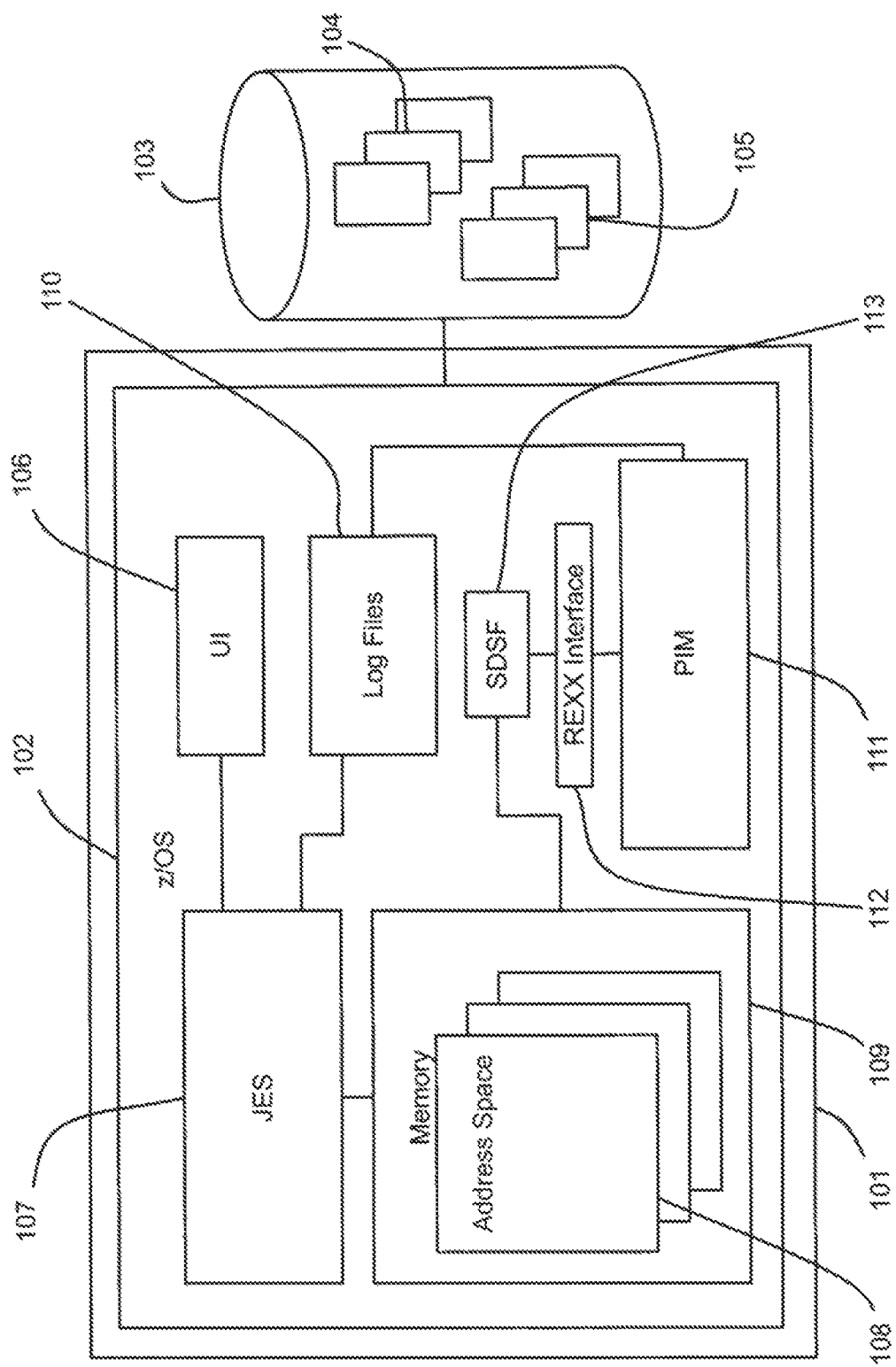
FIG. 1 is a schematic illustration of a computer comprising an operating system.

With reference to FIG. 1, a computer 101 is loaded with an operating system 102 and connected to a storage device 103. The operating system 102 is arranged to provide a processing platform for programs 104 stored in associated files on the storage device 103. Data relating to the programs 104 is also stored in data files 105 on the storage device 103. In the present embodiment, the computer 101 is a mainframe computer in the form of an IBM zSeries® (zSeries is a trademark of International Business Machines Corporation, registered in many jurisdictions worldwide) computer and the operating system 102 is a mainframe operating system in the form of the z/OS operating system both from International Business Machines Corporation.

The operating system 102 comprises a user interface 106 arranged, among other functions, to enable users to initiate the processing of one or more of the programs 104 on the computer 101. In the present embodiment, the instances of the programs 104 run by the computer 101 are referred to as jobs. Processing of programs or jobs may be arranged to start immediately in response to a user command or run in groups of one or more as batch jobs at a predetermined time or in accordance with a predetermined schedule. These two types of job are thus referred to as started tasks and batch jobs respectively.

The processing of a job is managed by a job entry subsystem (JES) 107, which in the present embodiment, is a component of the operating system 102. The JES 107 is arranged, under user control, to receive jobs into the operating system 102, schedule them for processing and to control their output processing. Each job is provided with an address space 108 in memory 109 of the computer 101 in which to perform its processing. In the present embodiment, each instance of a program 104 is provided with a dedicated address space in virtual memory.

The user interface 106 and the JES 107 are arranged to enable a user to provide job-processing instructions to the computer 101 via a scripting language called job control language (JCL). The input JCL is processed by the JES 107 to perform the instructed processing of the programs 104. The JES 107 is arranged to produce a set of log files 110 for each job that is processed under its control. The log files 110 comprise data describing the processing performed by the computer in order to process the relevant job. One of the log files 110 comprises a copy of the expanded JCL that was executed by the computer in processing the associated job. In the z/OS operating system 102 this log file is named JESJCL. Another of the log files 110 comprises data and messages relating to the processing of the job, for example, details of where programs were loaded from, allocation and de-allocation information, messages or statistics relating to how the job was processed, reports on the success of the processing or messages from the processed program itself In the z/OS operating system 102 this log file is named JESYSMSG.

In the present embodiment, the operating system comprises a program identification module (PIM) 111, which is arranged, in response to a user command via the UI 106, to derive a start command for the job running or completed in a selected address space 108. In the present embodiment, the PIM 111 uses an interfacing facility 112 in the form of a REXX™ interface to access selected functions of a system monitor program 113, in the form of the system display and search facility (SDSF) of the z/OS operating system 102. The PIM 111 is arranged to use the SDSF 113 to identify the unique identifier that is assigned by the operating system to the job being processed or that has completed processing in the selected address space. In the z/OS operating system the unique identifier is called a Job ID. The PIM 111 uses the retrieved Job ID to search the log files 110 to identify the location from which the relevant program was loaded and the name of the program or procedure. The name of the program provides the basis for the start command for the relevant program. The PIM 111 is further arranged to search the log files 110 to identify the input or output parameters for the identified program and, where applicable, to identify any assigned parameter values, that is, the values that were passed to the program via the parameters on start-up. The PIM 111 is then arranged to reconstitute a start command for the program running in the selected address space.

The following code is an example of a z/OS program in the form of a procedure named "EXAMPLE1":

```
//EXAMPLE1    PROC HLQ='XXX',
//            SOUT='*',
//            PROJECT='P0'
//STEP1       EXEC
             PGM=TESTWTOR,MEMLIMIT=2G,REGION=0M
//STEPLIB    DD DISP=SHR,DSN=&HLQ..&PROJECT..LOAD
//SYSPRINT   DD SYSOUT=&SOUT.
//SYSIN      DD DUMMY
//PEND
```

In the present example, the processing of the procedure EXAMPLE1 is invoked using the following JCL start command, input to the JES 107 via the UI 106:

S EXAMPLE1,HLQ=USERHLQ,PROJECT=TEST

When the processing of the procedure EXAMPLE1 is started under the control of the JES 107, it is assigned a Job ID and provided with an address space 108 in which to perform its processing. In response to a user request to the PIM 111 to derive a start command for the program running or completed in the selected address space 108, the PIM 111 is arranged to access the SDSF 113 via the REXX™ interface 112 to determine the relevant Job ID for the running program.

An example of the output of the SDSF 113 showing all running programs in a selected set of address spaces is set out below:

| JOBNAME | StepName | Job ID | Pos | DP | ASID | ASIDX |
|---------|----------|--------|-----|-----|------|-------|
| CMASJT3A | IYK2ZGV3 | JOB52502 | NS | EE | 84 | 0054 |
| WUIJT4A | IYK2ZGV4 | JOB52505 | NS | C1 | 87 | 0057 |
| EXAMPLE1 | STEP1STC09905 | NS | | F0 | 317 | 013D |

In z/OS, Job IDs are assigned in accordance with a predetermined protocol in which batch jobs are assigned a Job ID with a prefix that starts with the letter J. In the example above, the first two jobs are batch jobs and have Job IDs with the prefix "JOB". Started tasks are assigned Job IDs with a prefix that starts with the letter S. In the example above, the third job is a started task and has a Job ID with the prefix "STC". The output of the SDSF 113 also shows address spaces corresponding to each job in the ASID column. In the present example the address space of interest is 317, which corresponds to a Job ID of STC09905. Since the Job ID begins with the letter S the relevant program for the address space 317 is a started task.

Once the PIM 111 has identified the relevant Job ID and determined that it refers to a started task, the PIM 111 uses the identified Job ID to search the log files 110. The following is the result of the search of the log files 110 for the identified Job ID:

| DDNAME | DSName |
|--------|--------|
| JESJCLIN | IBMUSER.EXAMPLE1.STC09905.D0000001.-JESJCLIN |
| JESMSGLG | IBMUSER.EXAMPLE1.STC09905.D0000002.-JESMSGLG |
| JESJCL | IBMUSER.EXAMPLE1.STC09905.D0000003.JESJCL |
| JESYSMSG | IBMUSER.EXAMPLE1.STC09905.D0000004.-JESYSMSG |
| $INTTEXT | IBMUSER.EXAMPLE1.STC09905.D0000005.-$INTTEXT |

The above search result provides the locations (DSName) of the JESMSGLG and JESJCL log files for the identified Job ID STC09905. The PIM 111 first inspects the JESMSGLG file, which provides the following information:

```
2  IEFC001I PROCEDURE EXAMPLE1 WAS EXPANDED USING
   SYSTEM LIBRARY USER.PROCLIB
4  IEFC002I INCLUDE GROUP SETC420 WAS EXPANDED USING
   SYSTEM LIBRARY USER.PROCLIB
6  IEFC002I INCLUDE GROUP SETPARAMS WAS EXPANDED
   USING SYSTEM LIBRARY USER.PROCLIB
8  IEFC002I INCLUDE GROUP INITCTLG WAS EXPANDED USING
   SYSTEM LIBRARY USER.PROCLIB
16 IEFC002I INCLUDE GROUP CICSMAS WAS EXPANDED USING
   SYSTEM LIBRARY USER.PROCLIB
   IEF965I START EXAMPLE1 WITH JOBNAME EXAMPLE1 IS
   ASSIGNED TO USER IBMUSER , GROUP TSOUSER
```

From line 2 of the statement of the above JESYSMSG log file data the PIM 111 is arranged to identify the name of the program, referred to here as a procedure, corresponding to the Job ID. The procedure name "EXAMPLE1" corresponds to the basic start command for the procedure.

The PIM 111 then inspects the JESJCL file, which provides the following information:

```
1   //EXAMPLE1      JOB MSGLEVEL=1                STC09905
2   //STARTING      EXEC EXAMPLE1,STRT=INITIAL
3   XXEXAMPLE1     PROC HLQ='XXX',
    XX             SOUT='*',
    XX             PROJECT='P0'
4   XXSTEP1   EXEC PGM=TESTWTOR,MEMLIMIT=2G,REGION=0M
5   XXSTEPLIB      DD DISP=SHR,DSN=&HLQ..&PROJECT..LOAD
    IEFC653I SUBSTITUTION JCL -ISP=SHR,DSN=USERHLQ.TEST.LOAD
6   XXSYSPRINT     DD SYSOUT=&SOUT.
    IEFC653I SUBSTITUTION JCL - SYSOUT=*
7   XXSYSIN        DD DUMMY
8   XX PEND
```

The PIM 111 is arranged to parse the PROC statement to identify all the symbolic parameters and their default values, if any. In the present example the following parameters will be identified:

HLQ—XXX
SOUT—*
PROJECT—P0

The PIM 111 then parses the subsequent substitution messages, identified by the code IEFC653I, to identify any substitutions made to the default values by the JCL. In this case we can see from line 6 in the JESJCL output above that the SOUT parameter maintains its default value. From line 5 we can see that both HLQ and PROJECT parameters have been assigned new values. Therefore, the PIM 111 determines that in the originating start command no value was specified for the SOUT parameter and the HLQ and PROJECT parameters were assigned the values USERHLQ and TEST respectively.

A start command for a program in z/OS has the following format:

/START        TASKNAME,PARM1=VALUE1, PARM2=VALUE2 . . .

Thus, in the present example, the PIM 111 is able to derive the following start command for the program running or completed in the identified address space 317:

/START        EXAMPLE1,HLQ=USERHLQ, PROJECT=TEST

Figure 2:
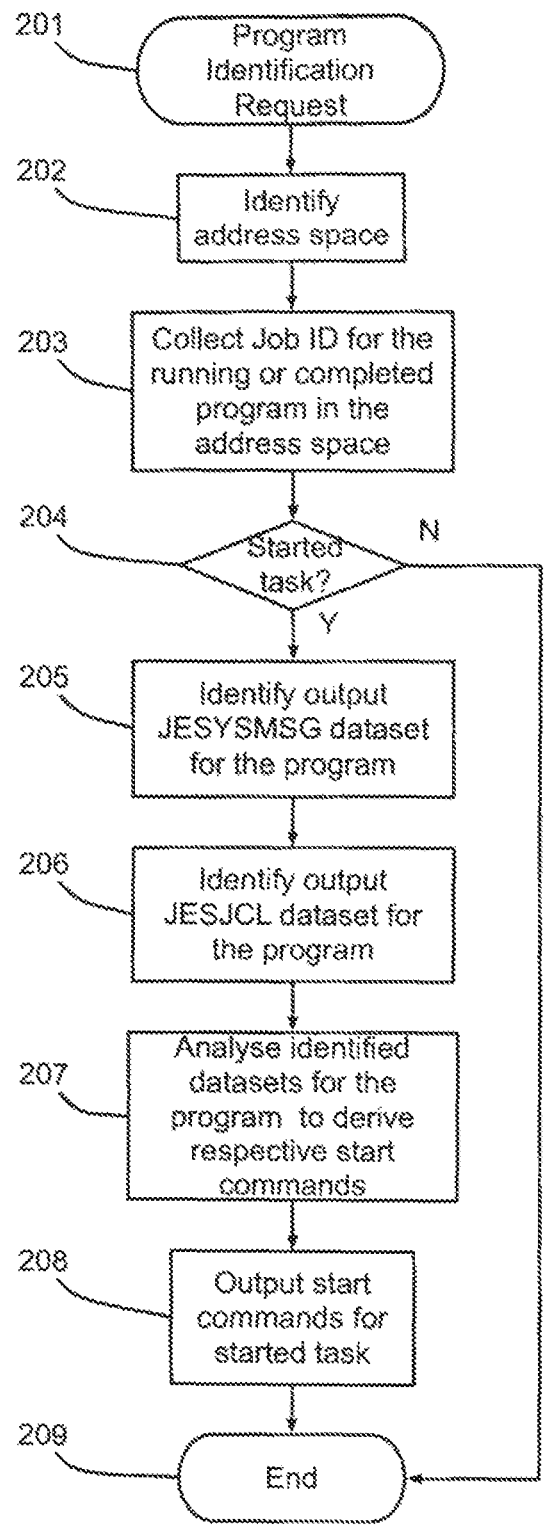
FIGS. 2 & 3 are flow charts illustrating processing performed in the operating system of FIG. 1.

The processing performed by the PIM 111 when deriving the start command for a program running or completed in a given address space will now be described further with reference to the flow chart of FIG. 2. Processing is initiated at step 201 in response to a user command input to the PIM 111 via the UI 106 and processing moves to step 202. At step 202, the address space 108 indicated by the user is identified and processing moves to step 203. At step 203, the Job ID is inspected to determine whether or not it indicates a started task and if so processing moves to step 204. At step 204, the Job ID for the instance of the program 104 running or completed in the address space 108 is identified via the SDSF 113 and processing moves to step 205. At step 205, the JESYSMSG data file for the Job ID is identified from the log files 110 and processing moves to step 206. At step 206, the JESJCL data file for the Job ID is identified from the log files 110 and processing moves to step 207. At step 207, the identified datasets are analysed to identify the start command for the identified program along with any parameters and assigned parameter values and processing moves to step 208. At step 208, the derived start command is output and processing moves to step 209 and ends. If, at step 203, the Job ID indicates that the job is not a started task then an error message is returned to the user and the processing moves to step 209 and ends.

Figure 3:
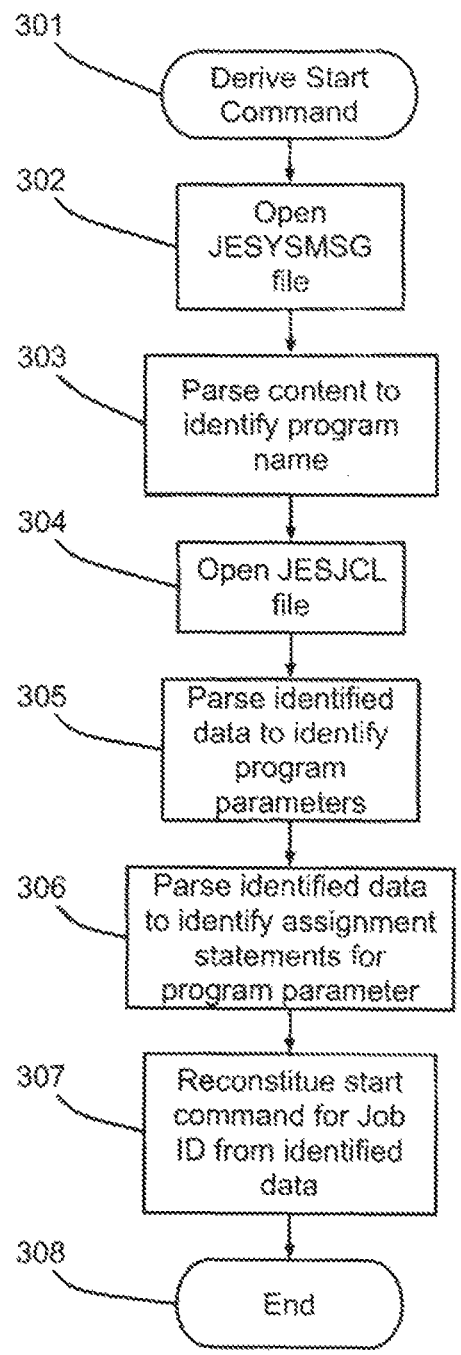

The processing performed by the PIM 111 in step 207 of the flow chart of FIG. 2, when deriving the start command for a program identified by a given Job ID, will now be described further with reference to the flow chart of FIG. 3. Processing is initiated at step 301 and moves to step 302 where the identified JESYSMSG file is opened and processing moves to step 303. At step 303, the contents of the JESYSMSG file are parsed to identify the name of the program 104 associated with the Job ID and processing moves to step 304. At step 304, the identified JESJCL file is opened and processing moves to step 305. At step 305, the contents of the JESJCL file are parsed to identify the parameters of the identified program and processing moves to step 306. At step 306, contents of the JESJCL file are parsed further to identify any parameter values passed to the instance of the identified program and processing moves to step 307. At step 307, the start command including any identified parameters and assigned parameter values is reconstituted and returned to the processing of step 207 in FIG. 2. Processing then moves to step 308 and ends.

In a further embodiment, the PIM is arranged to maintain a list of the start commands relating to each of a predetermined set or range of assigned address space. In other words, in this embodiment, the start commands for a set of address spaces that comprise started tasks or processes are pre-calculated. The pre-calculated set of start commands may be updated either in response to the assignment of a new address space or by periodic checks for new address spaces. In other words, the set of start commands for multiple systems or programs can be obtained and then updated to take into account any changes to existing systems and programs as well as the addition of new systems.

In another embodiment, dedicated code is provided for identifying the Job ID of the process running or completed in a selected address space. Such dedicated code is provided in place of the use of the SDSF via a REXX™ interface described above. The dedicated Job ID identification code may be provided as a standalone program or its functionality provided by or incorporated in the PIM.

As will be understood by those skilled in the art, the PIM may return partial start commands, for example, excluding parameters or parameter values. As will be understood by those skilled in the art, the PIM will be able to derive the start command for a job that has completed its processing in a given address space as long as the relevant output logs have not been deleted.

Embodiments of the invention are arranged to enable the derivation of the start command for started task running or completed in an address space. This enables a user to identify an address space and easily instruct the stop and restart of the relevant program, process, procedure or job. Furthermore, if an address space needs to be cloned, mirrored or otherwise replicated, the relevant start command can be efficiently, fully and accurately identified automatically. Replication is commonly used to support vertical scaling and rollover failsafe tolerance in virtual address spaces.

As will be understood by those skilled in the art, embodiments of the invention may be applied to any suitable operating system and are not restricted to the z/OS operating system. For example, embodiments of the invention may also be applied to earlier versions of the z/OS operating system such as OS/360, OS/370 and OS/390® (OS/390 is a trademark of International Business Machines Corporation, registered in many jurisdictions worldwide) in addition to any other suitable operating system.

It will be understood by those skilled in the art that the apparatus that embodies a part or all of the present invention may be a general purpose device having software arranged to provide a part or all of an embodiment of the invention. The device could be a single device or a group of devices, and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the drawings illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. An apparatus for automatically deriving a command for starting a program, said apparatus comprising a computer being operable to:
receive a user command identifying an address space, wherein the address space is a location in a memory of the computer;
identify the program in said address space;
search data logged by an operating system as a result of processing said identified program to identify a start command for initiating processing of said identified program; and
output said identified start command.

2. An apparatus according to claim 1, wherein said searching is performed only for individual user started programs.

3. An apparatus according to claim 1, wherein said searching is omitted for programs associated with batch jobs.

4. An apparatus according to claim 1, wherein said program is identified by a unique identifier.

5. An apparatus according to claim 4, wherein said identifier comprises data indicating whether the associated program is a user started program or a batch program.

6. An apparatus according to claim 1, wherein said logged data comprises a set of instructions provided for initiating the processing of said program in said address space.

7. An apparatus according to claim 6, wherein said set of instructions are provided in a job control language.

8. An apparatus according to claim 1, wherein said logged data comprises a set of processing messages reporting processing steps in the processing of said program in said address space.

9. An apparatus according to claim 1 being further operable to:
search said logged data to identify a set of parameters corresponding to said start command; and
output any identified set of parameters in association with said identified start command.

10. An apparatus according to claim 9 being further operable to:
search said logged data to identify the assignment of values to said set of parameters; and
output any identified parameters values in association with said set of parameters.

11. An apparatus according to claim 1, wherein said address space is a virtual address space.

12. An apparatus according to claim 1, wherein the processing of said program is managed by a job entry subsystem.

13. An apparatus according to claim 1, wherein said operating system is z/OS.

14. A computer program product comprising program code stored on a non-transitory computer readable storage medium and loadable into the internal memory of a computer, the program code being operable, when run on the computer, for performing the steps of:
receiving a user command identifying an address space, wherein the address space is a location in the memory of the computer;
identifying a program in said address space;
searching data logged by an operating system as a result of processing said identified program to identify a start command for initiating processing of said identified program; and
outputting said identified start command.

* * * * *